May 19, 1964
L. JÄGER
3,133,711
MAGNETIC TAPE DICTATING MACHINE
Filed March 29, 1962
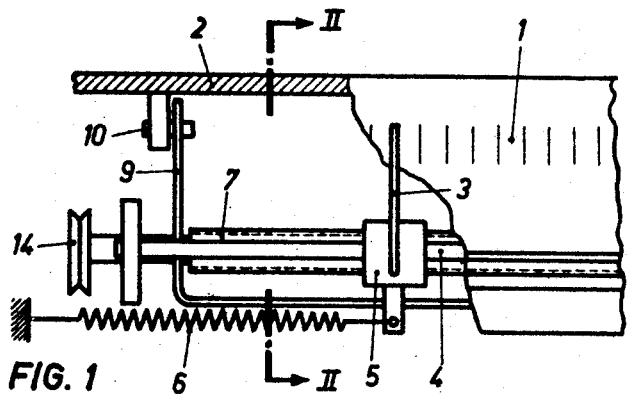
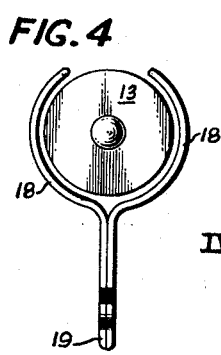
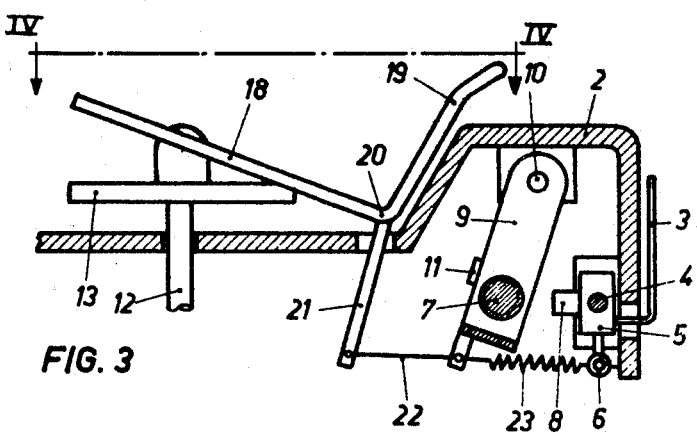
INVENTOR
LOTHAR JÄGER
BY
AGENT United States Patent Office 3,133,711
Patented May 19, 1964

3,133,711
MAGNETIC TAPE DICTATING MACHINE
Lothar Jäger, Vienna, Austria, assignor to North American Philips Company, Inc., New York, N.Y., a corporation of Delaware
Filed Mar. 29, 1962, Ser. No. 183,522
Claims priority, application Austria Apr. 7, 1961
3 Claims. (Cl. 242—55.12)

In magnetic recorders and/or reproducers, in particular dictating apparatus, it is desirable to be able to establish at any moment how much of the supply of tape stored in a holder (reel or magazine) is used. The drive for the indicating means required for this purpose is effected by a shaft which is driven only while the tape leaves the supply holder, for example by the shaft of the table on which a spool is laid which serves as a holder and which may be housed in a magazine. Indicating means for counting decades or, for the sake of clarity, in particular in dictating apparatus, devices having a scale and a pointer, in which a fixed scale and a movable pointer or fixed pointer and a movable scale are used. The devices known so far have the drawback that the indicating means after use of the supply of tape have to be adjusted to zero manually so that they will be ready for operation when a new supply of tape is laid on the apparatus.

According to the invention, in a magnetic recorder and/or reproducer in particular a dictating apparatus, having an indicator which indicates the quantity of a tape taken from a supply holder, the displacement of the movable members of the indicator from their zero position is provided by means of a coupling member from a shaft rotating with the supply holder. The coupling member can be decoupled and is provided with an adjusting member (sliding rod, lever, cable or the like) which, when the supply holder is laid on or is removed from the apparatus, can be adjusted by said holder or by actuating an auxiliary device provided on the apparatus for removing the holder. When the supply holder is removed the movable members of the indicator can be set to their zero position by means of a draw-spring.

In a preferred first embodiment of the invention the coupling member which, in its rest position is kept out of engagement by spring tension, is provided with an adjusting member or feeler (lever, pin or the like) for bringing the coupling member into engagement, said scanning member a feeler extending into the space of the apparatus receiving the supply holder and being displaced, when the supply holder is laid on or removed from the recorder.

In a favourable second embodiment an ejector is provided for removing a supply holder on the apparatus, which ejector also acts as an adjusting member, is connected directly or via intermediate members to the coupling member. The engaged position of the coupling member being determined by spring tension.

In said second embodiment it is of advantage to provide, as ejector and adjusting member, a fork, which is tiltably arranged and the prong or tines of which extend below a supply holder laid on the apparatus.

In order that the invention may readily be carried into effect, embodiments thereof will now be described more fully, by way of example with reference to the accompanying drawing, in which:

FIG. 1 is a front elevation of a scale device employing a coupling member according to the invention.

FIG. 2 is a cross-sectional view taken along the line II—II of FIG. 1.

FIG. 3 also is a cross-section of a variation of the device shown in FIG. 1.

FIG. 4 is a plan view looking in the direction of arrows IV, IV of FIG. 3.

Referring now to FIG. 1, in front of a scale 1, which is mounted on the front of the chassis-plate 2, a pointer 3 is provided. This pointer is mounted on a slide 5 which is capable of sliding on a guide bar 4. The pointer 3 is returned to the zero position, on the left-hand side of the scale, by a spring 6. The slide 5 is driven by a screw spindle 7 when it engages the tooth 8 of the slide 5. The spindle 7 is pivoted in a brace 9 which is pivotable about a shaft 10 between two final positions, one of which being determined by a stop 11 and the other by the engagement between the shaft 7 and the tooth 8.

If, as in the embodiment described, separate spools or spools which are housed in magazines are used as a holder of the supply of tape, the driving of the whole device can be effected in a simple way by the shaft 12 of the table 13 for the supply spool, from which the tape is wound when reproducing. As is known, when unwinding the tape from the supply reel this shaft is not rotated by the driving mechanism of the apparatus but by the pull of the tape. The movement of this shaft 12 is transmitted by reducing intermediate wheels and a belt on a driving wheel 14 which is provided on the spindle 7. Since these are not essential for the invention and may also be constructed differently, they are not shown. In the transmission of the movement of the shaft 12 to the movable member of the indicating means, namely to the pointer 3, the spindle 7 pivoted in the pivotable brace 9 not only forms a driving element but also a connectable and disconnectable coupling member.

As shown in FIG. 2, an adjusting pin 15 is provided on the brace 9 which projects through an aperture in the chassis-plate 2 into a space for receiving the supply holder 16 (spool or magazine). If this space is free, the brace 9 under the action of the spring 17, assumes the final position determined by the stop 11. Engagement between the shaft 7 and the tooth 8 is thus removed, and the pointer 3 is drawn to the zero position by the spring 6. When the supply holder or reel 16 is placed on the apparatus, the adjusting pin or feeler 15 is depressed and, as shown in FIG. 2, engagement of the coupling member is restored. As soon as unwinding of the tape begins, movement of the pointer also begins. If the supply reel 16, is removed, the pointer is immediately uncoupled and returns to zero following the pull of the spring 6. If without removing the supply holder the tape is wholly or partially wound, the pointer follows rotation of the shaft 12 also in the opposite direction and indicates the amount of tape supplied or remaining.

In the device shown in FIG. 3, an ejector 18 is provided for removing the supply holder placed on the apparatus, which consists of a fork having two prongs which embrace or encircle the table 13, said prongs being bent so as to form a handle 19 at an edge 20 about which the fork can be tilted. If the supply holder is laid on the apparatus, the teeth of the fork extend below the apparatus. Such an ejector is of particular advantage in those cases in which the supply holder i.e. reel or magazine is provided in a recess of the cover plate of the apparatus. By depressing the handle 19, the supply holder is lifted and can then easily be removed. The fork 18 also comprises a lug-shaped extension 21 which is connected to the brace 9 via a cable 22. In this embodiment, the brace 9 is kept in the final position by the spring 23 in which position the shaft 7 and the tooth 8 are engaged. However, the engagement is removed immediately if the handle 19 is depressed, which is the case, for example, when the empty supply magazine is removed. This situation is shown in FIG. 3. In this case also the pointer immediately returns to the zero position following the pull of the spring 6. When rewinding the tape into the supply magazine it follows the movement of the shaft 12.

It will be clear that the invention is not to be restricted to the embodiments described in these examples, many variations being possible without departing from the scope of the invention.

What is claimed is:

1. In a magnetic tape dictating machine, means comprising a graduated scale and associated pointer and driving means for imparting relative movement between said scale and pointer, said driving means including a coupling member, means movably mounting said coupling member for coupling and uncoupling said driving means, and an adjusting member connected with said coupling member for moving said coupling member from said coupled to said uncoupled position, said coupling member in said uncoupled position disabling said driving means, said adjusting member being adapted and arranged on said machine for engagement with a tape supply holder placed in operative position on said machine.

2. A magnetic tape dictating machine according to claim 1 with the addition of a spring for returning said pointer means to a starting position when said coupling member is uncoupled and a second spring for urging said coupling member into uncoupled position, said adjusting member being positioned and arranged for moving said coupling member to coupled position against the force of said second spring.

3. A magnetic tape dictating machine according to claim 1 with the addition of a spring for returning said pointer means to a starting position when said coupling member is uncoupled and a second spring for urging said coupling member into coupled position, said adjusting member being pivotally supported and having a bifurcated portion and a handle portion whereby said adjusting member is operable for ejecting said supply holder and said coupling member is coupled only when said supply holder is positioned on said machine.

References Cited in the file of this patent
UNITED STATES PATENTS

| | | |
|---|---|---|
| 1,955,691 | Swanson | Apr. 17, 1934 |
| 2,086,130 | Hickman et al. | July 6, 1937 |
| 2,357,076 | Briskin et al. | Aug. 29, 1944 |
| 2,449,626 | Suthann | Sept. 21, 1948 |
| 2,540,299 | Shoup et al. | Feb. 6, 1951 |
| 2,572,596 | Camras | Oct. 23, 1951 |
| 2,767,474 | Schmitt | Oct. 23, 1956 |
| 2,987,956 | Planert et al. | June 13, 1961 |